(No Model.)

S. B. WILLIAMS.
PLOW ATTACHMENT.

No. 288,904. Patented Nov. 20, 1883.

WITNESSES.

INVENTOR
Samuel Britain Williams

UNITED STATES PATENT OFFICE.

SAMUEL B. WILLIAMS, OF SAILOR'S REST, TENNESSEE.

PLOW ATTACHMENT.

SPECIFICATION forming part of Letters Patent No. 288,904, dated November 20, 1883.

Application filed May 2, 1883. (No model.)

*To all whom it may concern:*

Be it known that I, SAMUEL B. WILLIAMS, a citizen of the United States, residing at Sailor's Rest, in the county of Montgomery and State of Tennessee, have invented certain new and useful Improvements in Plow Attachments; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention has for its objects to provide a cheap and simple means whereby the furrow, as it leaves the mold-board of any ordinary plow, may be cut and pulverized, evenly distributing the earth along the path of the plow as it is driven across a field, thus gaining the twofold advantage of a plow and harrow.

These objects I accomplish by the means shown and illustrated in the accompanying drawings, in which—

Figure 1:
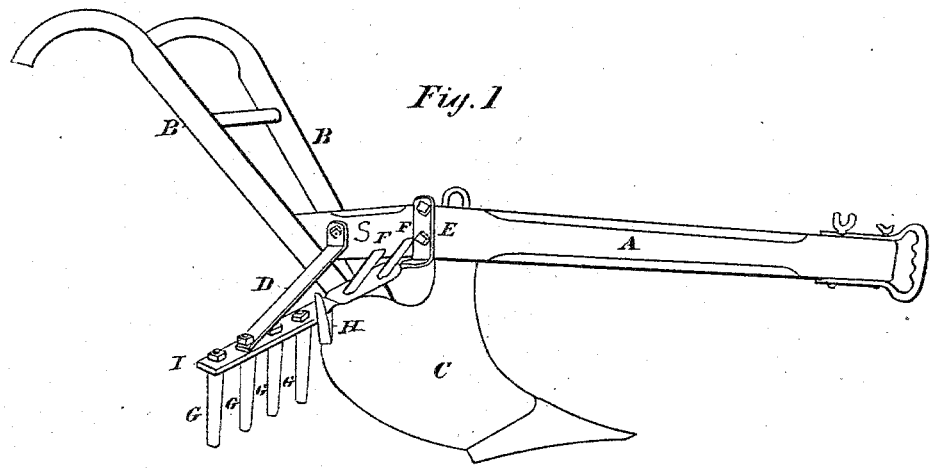
Figure 2:
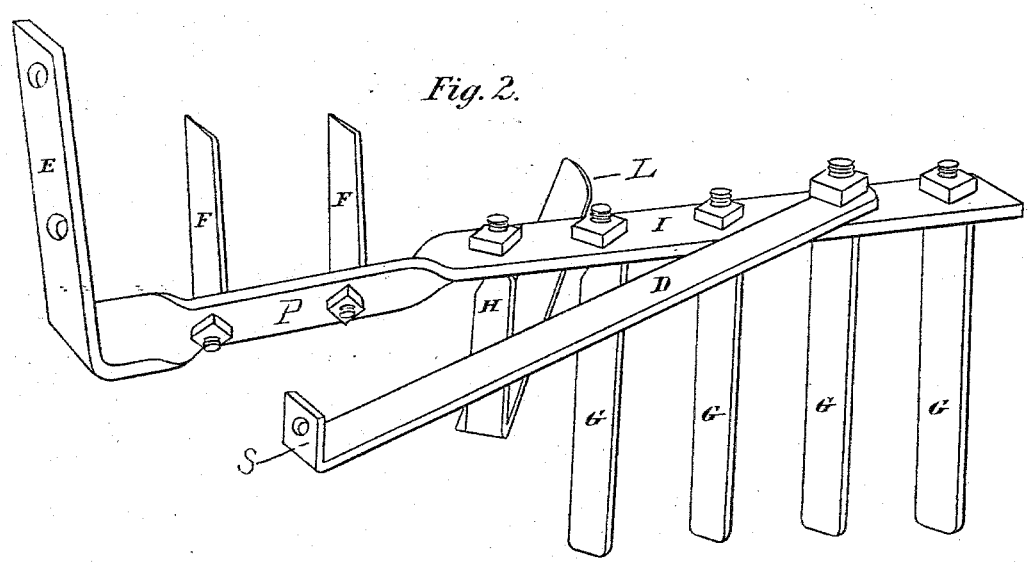

Figure 1 is a representation of a plow, showing my improvements applied; and Fig. 2 is a perspective view of the device removed from the plow.

Referring to the drawings by letter, I designate a flat bar of metal, which is provided with a suitable number of vertical perforations for the reception of the teeth or cutters G. These cutters are shown four in number, but may be of any number desired, according to the size of the plow to which they are applied and the length of the said bar. In the inner perforation of the flat portion of this bar is also secured a cutter, a portion of which, as shown at H, extends downwardly parallel with relation to the teeth G, and terminates in an upwardly-oblique cutting-edge, L, the object of which will be hereinafter explained. The bar I is provided at its inner end with a vertical arm, E, which is arranged relatively at right angles to the outer straight portion, as shown, and is provided with perforations or other suitable means whereby the said bar may be secured to the plow-beam near the bisection of the handles. The bar I is provided between the outer flat portion and inner rectangular arm, E, with a twisted portion, P, which is also provided with teeth or cutters F. These teeth in operation are designed to slightly overhang the mold-board of the plow, and first strike the furrow, which is afterward thrown in contact with the angular cutter H, and finally with the vertical teeth or pulverizing-cutters G.

D indicates a brace-arm, one end of which is provided with a perforation, which may be placed over any of the upper threaded ends of the vertical cutters, and secured thereto by means of a nut, as shown. The opposite end of this brace is provided with a rectangular arm, s, which is also perforated, whereby it may be secured to the plow-beam. The attachment, when secured to a plow, assumes a rearward oblique or diagonal position with relation to the plow-beam, the angular cutter and cutters F being in rear of the mold-board.

Having thus described my invention, what I claim as new, and desire to secure by Letters Patent, is—

The combination, with the plow-beam A, of the bar I, having the right-angled clamping portion E, the brace D, the oblique upper knives, F, the downward-projecting knives G, and the angular knife H, all arranged substantially as shown and described.

April 28, 1883.

SAMUEL B. WILLIAMS.

Witnesses:
HENRY WILLIAMS,
JAMES STEELE.